SOUND REPRODUCTION SYSTEM

Filed Nov. 21, 1955

INVENTORS
DERK KLEIS
ROELOF VERMEULEN
BY Fred M. Vogel
AGENT 3,015,701
Patented Jan. 2, 1962

3,015,701
SOUND REPRODUCTION SYSTEM

Derk Kleis and Roelof Vermeulen, Eindhoven, Netherlands, assignors, by mesne assignments, to North American Philips Company, Inc., New York, N.Y., a corporation of Delaware Filed Nov. 21, 1955, Ser. No. 548,211
Claims priority, application Netherlands Nov. 30, 1954
3 Claims. (Cl. 179—100.1)

Figures 1, 2:
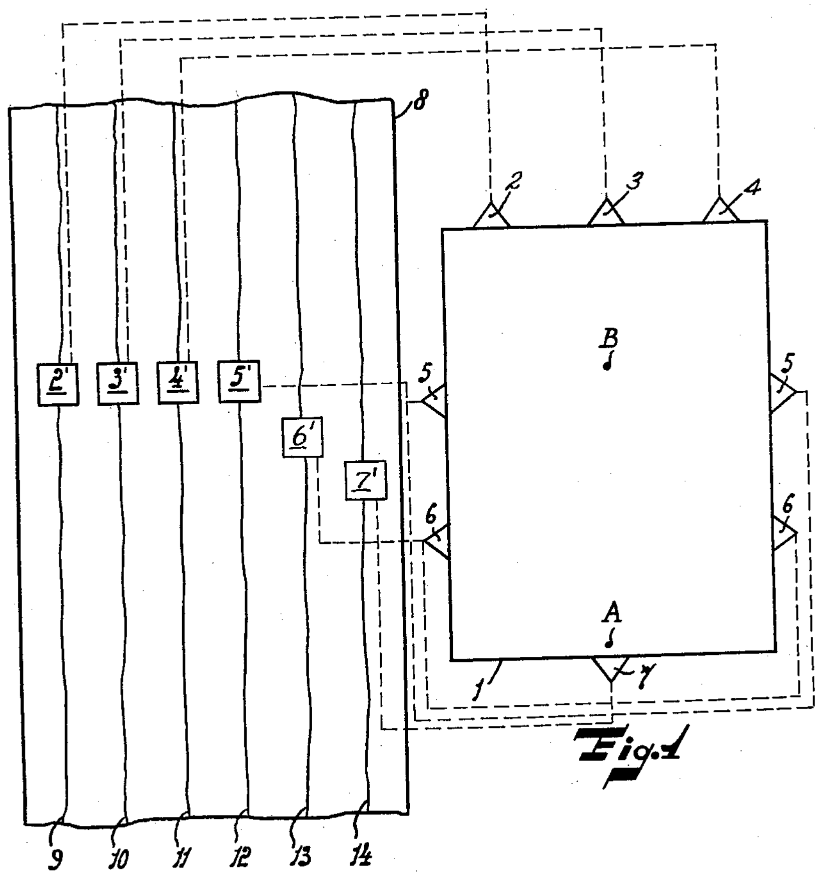

The invention relates to a system for reproducing sound, more particularly in an enclosed area, with the aid of a number of loudspeakers which are distributed about said enclosed area, for example, along the boundaries of said area. Said loudspeakers jointly reproduce the sound of a film recording to produce diffuse sound. The term "diffuse sound" as used herein means sound which reaches the listener at about the same intensity and with about the same time delay substantially from all directions. It is, however, possible to create a localization of the sound from predetermined loudspeakers in the diffuse sound image, as may, for example, be the case with a soloist accompanied by an orchestra.

In accordance with the present invention a method of reproducing sound, more particularly in enclosed areas, comprises utilizing a recording which, in addition to a single sound track or to a number of sound tracks which may be associated stereophonically, contains a number of additional sound tracks which are separately scanned by reproducing elements or heads which are each connected to one or more loudspeakers. In said additional sound tracks substantially the same signal with, however, different timbre and/or intensity is recorded, and a required mutual time delay in the reproduction of the signal recorded in said sound tracks is obtained by means of a time delay previously provided in said tracks, or by means of the positioning of the scanning reproducing elements, or by a combination of both. The loudspeaker (or loudspeakers), which insures (or insure) the reproduction of the signals provided by the initial sound tracks, usually is (or are) positioned on one side of said enclosed area and will hereinafter be referred to as direct loudspeaker (or loudspeakers) while the remaining, or indirect, loudspeakers insure the reproduction of the so-called indirect sound.

It is an important advantage of the method of the present invention that the presence or absence and the nature of the diffuse sound may be determined when producing the sound recording and consequently need not be effected at the point or points of reproduction. This advantage is the more important when a certain recording itself or a number of copies of it must be reproduced at a plurality of points, as usually is the case.

In some cases, for example, in motion picture theatres, it may be desirable for sound of a predetermined nature such as music, to be reproduced by means of the indirect loudspeakers or by all the loudspeakers together in a manner such that the listener at any point in the enclosed area is unable to locate the virtual sound image. This is the situation with background music which acts as an accompaniment for a motion picture film, there being no direct connection between the acoustic and the visual observation, so that there is no need to localize the sound image.

The method of the present invention permits the selection of the mutual time delays of the signals reproduced by the loudspeakers in such a manner that a diffuse sound is actually produced, the direction of which substantially cannot be located. The selection of the mutual delay times must be based on the consideration that a listener at any point in the enclosed area should not hear the sound of the nearest loudspeaker for which the transit time of the sound is smallest and the intensity is highest, first. Thus, the sound image will not be located at the said loudspeaker.

This can be achieved both when the direct loudspeakers take part in the total reproduction of sound in said area and when they do not take part therein. In the first case, a delay must also be introduced between the time of reproduction of the direct loudspeakers and that of the indirect loudspeakers.

On the other hand, it may be desired to locate the sound image at the direct loudspeakers which are positioned on one side of the enclosed area. An example is the case where a singer is projected on a screen having the loudspeakers positioned behind it. The logical and natural reproduction of the sound is that in which the voice of the singer is actually heard emanating from the picture of the singer, although the indirect loudspeakers which surround the listener also contribute towards the sound reproduction.

Hence, when all the sound tracks, including the additional sound tracks, contain at least one common signal, according to the method of the present invention, in order to insure localization of the virtual sound source at the loudspeakers or loudspeaker groups which are not fed by the additional sound tracks, the reproduction of the common signal is sufficiently delayed, preferably from 5 to 50 milliseconds, with respect to the reproduction of the remainder of the sound tracks, with the aid of the first of the reproducing elements to scan said additional sound tracks.

This is based on the fact that for a delay time of 5 milliseconds or less, the effects, in respect to localization, of time differences and intensity differences are the same (the effect of a time delay of 1 millisecond being substantially similar to that of a decrease in intensity of 5 db) and the effects are additive, whereas for a time delay exceeding 5 milliseconds the direction of the first sound to reach the listener dominates and may be influenced only by very large intensity differences.

In order that the invention may be readily carried into effect it will now be described with reference to the accompanying drawing, wherein:

FIG. 1 is a schematic diagram of an enclosed area around which both direct and indirect loudspeakers are distributed in accordance with the present invention; and FIG. 2 is a schematic diagram of part of a film recording and several reproducing heads in accordance with the present invention.

FIG. 1 represents an enclosed area 1 which is provided with three direct loudspeakers 2, 3 and 4, on one side. Said direct loudspeakers insure the production of three stereophonically associated signals. On the other sides of the enclosed area, loudspeakers 5, 6 and 7 are positioned to insure the production of the indirect sound. The loudspeakers 5 and 6 are interconnected.

FIG. 2 is a schematic diagram of part of a film recording and several reproducing heads in accordance with the present invention. A sound recording 8, contains six sound tracks 9, 10, 11, 12, 13 and 14, the first three of which represent stereophonically associated signals and the remaining three of which represent the additional sound tracks. The sound tracks are scanned by a number of reproducing heads 2', 3', 4', 5', 6', and 7' which are numbered to correspond to the reference numerals of their associated loudspeakers. In said additional sound tracks substantially the same signal is recorded with different timbre and intensity. The recording 8 may be a magnetic tape and the reproducing heads 2', 3', 4', 5', 6' and 7' may be magnetic heads, if desired.

Due to the magnitude of the area 1, a listener seated at A will perceive direct sound from the loudspeakers 2, 3 and 4 after, say, 70 milliseconds. This corresponds to a distance of approximately 24 meters. In order to insure that the sound image is not located at the nearest loudspeaker 7, which takes part in the reproduction of the sound, the sound produced by the loudspeaker 7 must be delayed relative to the direct sound by at least 70 milliseconds. If the loudspeaker 5 were alotted the same time delay, a listener seated at B, who is approximately equidistant from the loudspeakers 3 and 5, would perceive the indirect sound produced by the loudspeaker 5 as an echo of the direct sound.

The above-mentioned difficulties may be obviated by the method of the present invention, in which use is made of different delay times. The fact that said delay times are provided during the recording of the additional sound tracks permits the positioning of the reproducing heads for scanning the sound tracks on the recording 8 in a straight line which is at right angles to the direction of movement of said recording. It is evident that mutual differences in the delay times can also be introduced by a subsequent displacement of the reproducing heads along the direction of length of the recording 8. The first-mentioned method is preferable, however, when the recording 8 is guided over a sound roller, in which event the tangent between the sound roller and said recording is preferably selected as the place of scanning for the reproducing elements, in view of the favorable scanning conditions at this place.

A proper selection of the delay-times provided in the recording and of the positioning of the reproducing heads permits the energization of the direct loudspeakers and the indirect loudspeakers in such a manner that any point within the area 1 is not only free from echo effects but may also be exposed to sound which may be either diffuse or localized in a predetermined direction, as desired.

It is to be understood that the invention is not limited to the details disclosed but includes all such variations and modifications as fall within the spirit of the invention and the scope of the appended claims.

What is claimed is:

1. A sound reproduction system for an enclosed area comprising a sound record having a plurality of primary sound tracks recorded thereon, a plurality of secondary sound tracks recorded on said sound record, said secondary tracks recording different intensities of substantially the same sound as that of said primary tracks, means for scanning said primary tracks comprising a reproducing head positioned in operative relation with each of said primary tracks, means for scanning said secondary tracks comprising a reproducing head positioned in operative relation with each of said secondary tracks, a plurality of loudspeakers positioned along the boundaries of said area for reproducing the sound recorded on said sound record, means for connecting each of the primary track reproducing heads to each of a predetermined group of said loudspeakers, said predetermined group being positioned at one side of the area to produce a source of localized sound, and means for connecting the secondary track reproducing heads to the remaining loudspeakers, said remaining loudspeakers being positioned around said area at different predetermined distances from said predetermined group to produce a source of non-localized sound, each reproducing head associated with a specific secondary track being connected to a remaining loudspeaker at a specific predetermined distance, said secondary track reproducing heads being so positioned with respect to each other that the reproduction of sound by said remaining loudspeakers is delayed by predetermined periods of time relative to the reproduction of sound by said predetermined group of loudspeakers.

2. A sound reproduction system for an enclosed area comprising a sound record having a plurality of primary sound tracks recorded thereon, a plurality of secondary sound tracks recorded on said sound record, said secondary tracks recording different intensities of substantially the same sound as that of said primary tracks, means for scanning said primary tracks comprising a reproducing head positioned in operative relation with each of said primary tracks, means for scanning said secondary tracks comprising a reproducing head positioned in operative relation with each of said secondary tracks, a plurality of loudspeakers positioned along the boundaries of said area for reproducing the sound recorded on said sound record, means for connecting each of the primary track reproducing heads to each of a predetermined group of said loudspeakers, said predetermined group being positioned at one side of the area to produce a source of localized sound, and means for connecting the secondary track reproducing heads to the remaining loudspeakers, said remaining loudspeakers being positioned around said area at different predetermined distances from said predetermined group to produce a source of non-localized sound, each reproducing head associated with a specific secondary track being connected to a remaining loudspeaker at a specific predetermined distance, said secondary sound tracks being recorded with relative time delays such that the reproduction of sound by said remaining loudspeakers is delayed by predetermined periods of time relative to the reproduction of sound by said predetermined group of loudspeakers.

3. A sound reproduction system for an enclosed area comprising a sound record having a plurality of primary sound tracks recorded thereon, a plurality of secondary sound tracks recorded on said sound record, said secondary tracks recording different intensities of substantially the same sound as that of said primary tracks, means for scanning said initial tracks comprising a reproducing head positioned in operative relation with each of said primary tracks, means for scanning said secondary tracks comprising a reproducing head positioned in operative relation with each of said secondary tracks, a plurality of loudspeakers positioned along the boundaries of said area for reproducing the sound recorded on said sound record, means for connecting each of the primary track reproducing heads to each of a predetermined group of said loudspeakers, said predetermined group being positioned at one side of the area to produce a source of localized sound, and means for connecting the secondary track reproducing heads to the remaining loudspeakers, said remaining loudspeakers being positioned around said area at different predetermined distances from said predetermined group to produce a source of non-localized sound, each reproducing head associated with a specific secondary track being connected to a remaining loudspeaker at a specific predetermined distance, said secondary track reproducing heads being so positioned with respect to each other and said secondary sound tracks being recorded with such relative time delays that the reproduction of sound by said remaining loudspeakers is delayed by predetermined periods of time relative to the reproduction of sound by said predetermined group of loudspeakers.

References Cited in the file of this patent

UNITED STATES PATENTS

| | | |
|---|---|---|
| 1,358,053 | Bascom | Nov. 9, 1920 |
| 2,017,153 | Kellogg | Oct. 15, 1935 |
| 2,298,618 | Garity | Oct. 13, 1942 |
| 2,327,956 | Begun | Aug. 24, 1943 |
| 2,419,894 | Hayes | Apr. 29, 1947 |
| 2,768,237 | Faulkner | Oct. 23, 1956 |
| 2,778,874 | Mueller | Jan. 22, 1957 |
| 2,941,044 | Volkmann | June 14, 1960 |